(12) United States Patent
Liu et al.

(10) Patent No.: US 6,741,064 B2
(45) Date of Patent: May 25, 2004

(54) POWER CHARGING SYSTEM AND RELATED APPARATUS

(75) Inventors: Sen-Hsiang Liu, Taipei Hsien (TW); Wei-Chen Tu, Taipei Hsien (TW)

(73) Assignee: Primax Electronics Ltd., Taipei (TW)

( * ) Notice: Subject to any disclaimer, the term of this patent is extended or adjusted under 35 U.S.C. 154(b) by 24 days.

(21) Appl. No.: 10/064,366

(22) Filed: Jul. 7, 2002

(65) Prior Publication Data

US 2003/0048096 A1 Mar. 13, 2003

(30) Foreign Application Priority Data

Sep. 7, 2001  (TW) ........................................ 90122198 A

(51) Int. Cl.⁷ ................................................. H02J 7/00
(52) U.S. Cl. .......................................... 320/107; 307/64
(58) Field of Search ................................ 320/107, 111, 320/114; 307/64, 82, 151

(56) References Cited

U.S. PATENT DOCUMENTS

| | | | | | |
|---|---|---|---|---|---|
| 5,280,229 | A | * | 1/1994 | Faude et al. | ................ 320/110 |
| 6,091,611 | A | * | 7/2000 | Lanni | ........................... 363/79 |
| 6,184,652 | B1 | * | 2/2001 | Yang | ........................... 320/110 |
| 6,204,637 | B1 | * | 3/2001 | Rengan | ....................... 320/137 |
| 6,211,649 | B1 | * | 4/2001 | Matsuda | ..................... 320/115 |
| 6,504,343 | B1 | * | 1/2003 | Chang | ......................... 320/124 |
| 6,563,713 | B2 | * | 5/2003 | Yang | ........................... 361/752 |
| 6,589,069 | B1 | * | 7/2003 | Liao | ........................... 439/501 |
| 6,614,206 | B1 | * | 9/2003 | Wong et al. | ................ 320/136 |
| 2002/0195993 | A1 | * | 12/2002 | Chiu | ........................... 320/114 |
| 2003/0117104 | A1 | * | 6/2003 | Liao | ........................... 320/107 |

\* cited by examiner

*Primary Examiner*—Gregory J. Toatley, Jr.
(74) *Attorney, Agent, or Firm*—Winston Hsu

(57) ABSTRACT

A power charging system for charging portable electric devices. The power charging system includes a plurality of transformers for transforming a plurality of different input voltages into a standard DC (direct current) voltage. The charging system also includes a power cord for inputting and outputting the standard DC voltage. The charging system also includes a plurality of converters for converting the standard DC voltage into the working voltage of the portable electric devices. Users connect the corresponding converters to the power cord and then connect the power cord to any one of the transformers to use the standard DC voltage to charge the portable electric devices.

17 Claims, 3 Drawing Sheets

POWER CHARGING SYSTEM AND RELATED APPARATUS

BACKGROUND OF INVENTION

1. Field of the Invention

The present invention relates to a power charging system, and more particularly, to a power charging system for portable electric devices.

2. Description of the Prior Art

In modern society, many people carry portable electric devices, such as a mobile phone, a PDA (personal digital assistant), a hand-held computer, a notebook computer, and so on. Many users carry two or more of these portable devices to access electrical data and interchange information with others. A charging system including a transformer and power cord designed for each portable electric device allows usage of these portable electric devices anytime and anywhere.

The convenience of portable electric devices becomes a disadvantage when users have to carry two or even more (depending on how many portable electric devices they carry) charging systems with them to charge their different portable electric devices. Please refer to FIG. 1. FIG. 1 is a schematic diagram illustrating a portable electric device 10A charging system according to prior art. The portable electric device 10A has a charging port 12A for inputting a DC (direct current) working voltage. Two corresponding transformers 16A and 18A are used to charge the portable electric device 10A. An AC (alternating current) power 20 is input via an input port 17A of the transformer 16A, altered by the transformer 16A to the working voltage of the portable electric device 10A, and output via an output port 14A of the transformer 16A. In a similar manner, a DC power 22 is input via an input port 19A of the transformer 18A, altered to the working voltage of the portable electric device 10A, and output via an output port 15A of the transformer 18A. Users can select the transformer 16A or 18A to charge the portable electric device 10A by connecting the input port of the transformer to a corresponding power source and connecting the output port of the transformer to the charging port 12A of the portable electric device 10A. In conclusion, an input power is first transformed into the specially designed working voltage of a portable device by a corresponding transformer, delivered from the output port of the transformer to the corresponding charging port of the portable electric device, and is finally used to charge the portable electric device.

According to a similar prior art, a portable electric device 10B, shown in FIG. 1, also has a specially designed charging port 12B for inputting its specially designed working voltage. The transformers 16B and 18B respectively have corresponding output ports 14B and 15B. An AC power 20 is input via an input port 17B of the transformer 16B, altered by the transformer 16B into the specially designed working voltage of the portable electric device 10B, and output to the charging port 12B via the output port 14B of the transformer 17B. Similarly, a DC power 22 is input via an input port 19B of the transformer 18B, altered to the specially designed working voltage of the portable electric device 10B, and output to the charging port 12B via the output port 15B of the transformer 18B.

Different portable electric devices have different specially designed working voltages. For example, the working voltage of modern portable electric devices varies from 3 volts to 12 volts. The charging port of each portable electric device also has a different shape and structure. A prior art portable electric device is equipped with its own specially designed transformer. These special transformers convert an input power via their input ports into the specially designed working voltage of the corresponding portable electric device. The output ports of these transformers must match the specially designed charging port of the portable electric device. Thus, when users carry two (or even more) portable electric devices, they have to carry corresponding specially designed transformers to charge their portable electric devices.

According to the prior art shown in FIG. 1, although the transformers 16A and 16B both can transform the AC power 20 to DC power, the transformed voltages that are output from each transformer are still the two specially designed and often different working voltages of the portable electric devices 10A and 10B. The output ports 14A and 14B of the transformers 16A and 16B also have different shapes. These two reasons make the specially designed transformer 16A of the portable electric device 10A incompatible with the portable electric device 10B. Likewise, the specially designed transformer 16B of the portable electric device 10B cannot charge the portable electric device 10A.

If users plan to charge a portable electric device with two different kinds of power sources, they have to carry at least two different specially designed transformers for each portable electric device to transform different power sources into the specially designed working voltage of the portable electric device. As shown in FIG. 1, users have to carry the two specially designed transformers 16A and 18A with them to charge the portable electric device 10A from two different power sources, the DC power 22 and the AC power 20.

A disadvantage of prior art is that users have to carry each specially designed transformer for each portable electric device to charge the portable electric device. It is obviously quite inconvenient for users to carry every possible charging combination for every portable electric device that they carry. Moreover, the weight and the volume of the transformers 16A or 16B, used in transforming AC power to DC power, is hard to further reduce. Additionally, it is also difficult to store power cords (power cords 21A and 23A of the transformers 16A and 18A) because of their lengths. Any portable electric device needs to be equipped with every kind of specially designed transformer to charge from different power sources, increasing the cost of portable electric devices and restricting the development of the information industry.

SUMMARY OF INVENTION

It is therefore a primary objective of the claimed invention to provide a single power charging system to charge a plurality of portable electric devices so as to solve the above mentioned problems.

According to the claimed invention, the charging system for charging a plurality of portable devices includes a corresponding charging port for inputting a working voltage, each of the portable devices having a different working voltage. The charging system includes a plurality of transformers for converting a plurality of different input voltages into a standard DC (direct current) voltage. Each of the transformers has an output port for outputting the standard DC voltage. The charging system includes a power cord that includes a first connection end removably connected to the output port of the transformer for inputting the standard DC voltage and a second connection end for outputting the standard DC voltage. The charging system also includes a plurality of converters to change the standard DC voltage into the corresponding working voltages of the plurality of portable devices. Each of the converters includes an input port removably connected to the second connection end of the power cord for receiving the standard DC voltage and an output port removably connected to the charging port of a portable device for outputting the working voltage of the portable device. When charging portable devices, users can connect the power cord to the corresponding converter and to any one of the transformers, using the standard DC voltage to charge the plurality of the portable devices.

It is an advantage of the claimed invention that a single power charging system can charge a plurality of portable electric devices.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
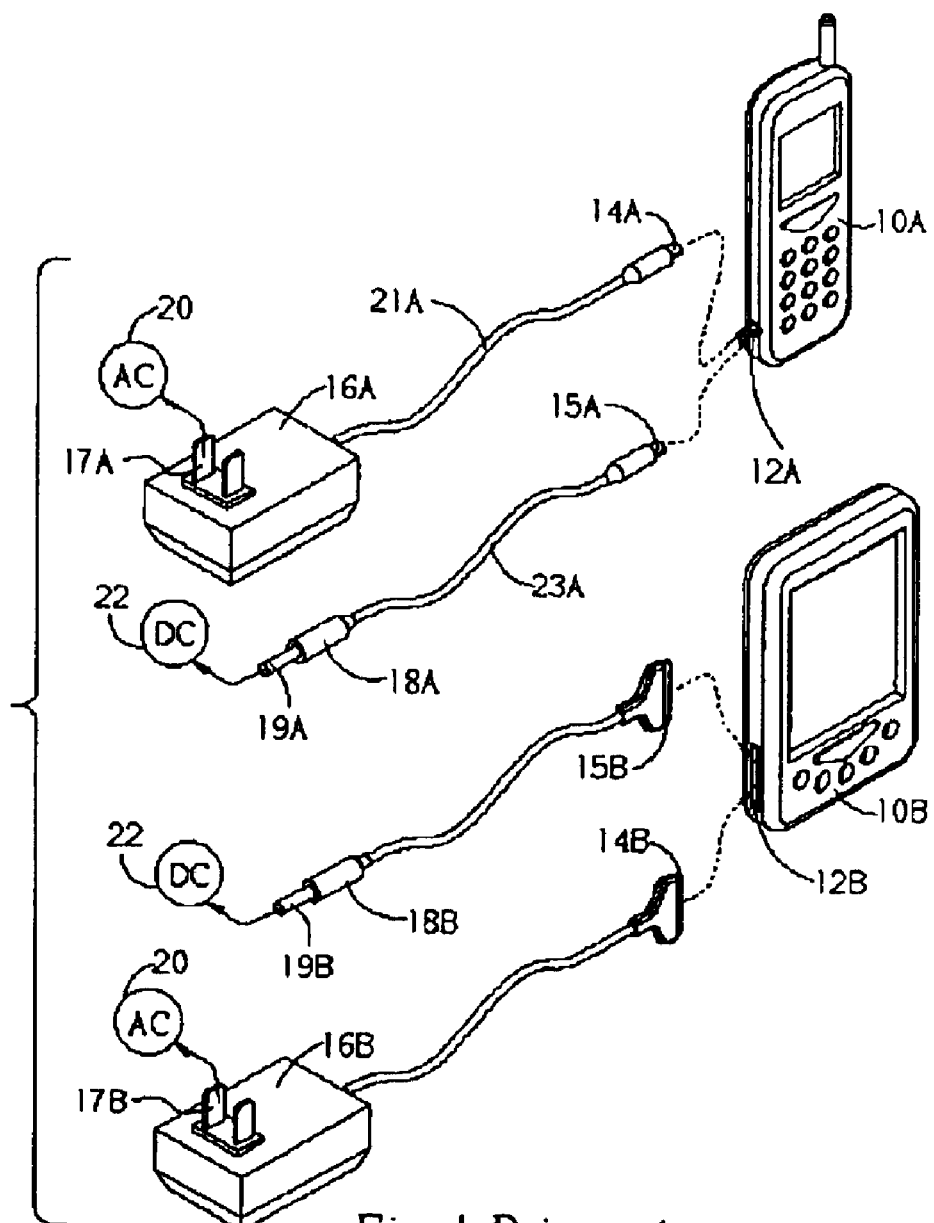
FIG. 1 is a schematic diagram of a charging system of a portable electric device according to the prior art.
Figure 2:
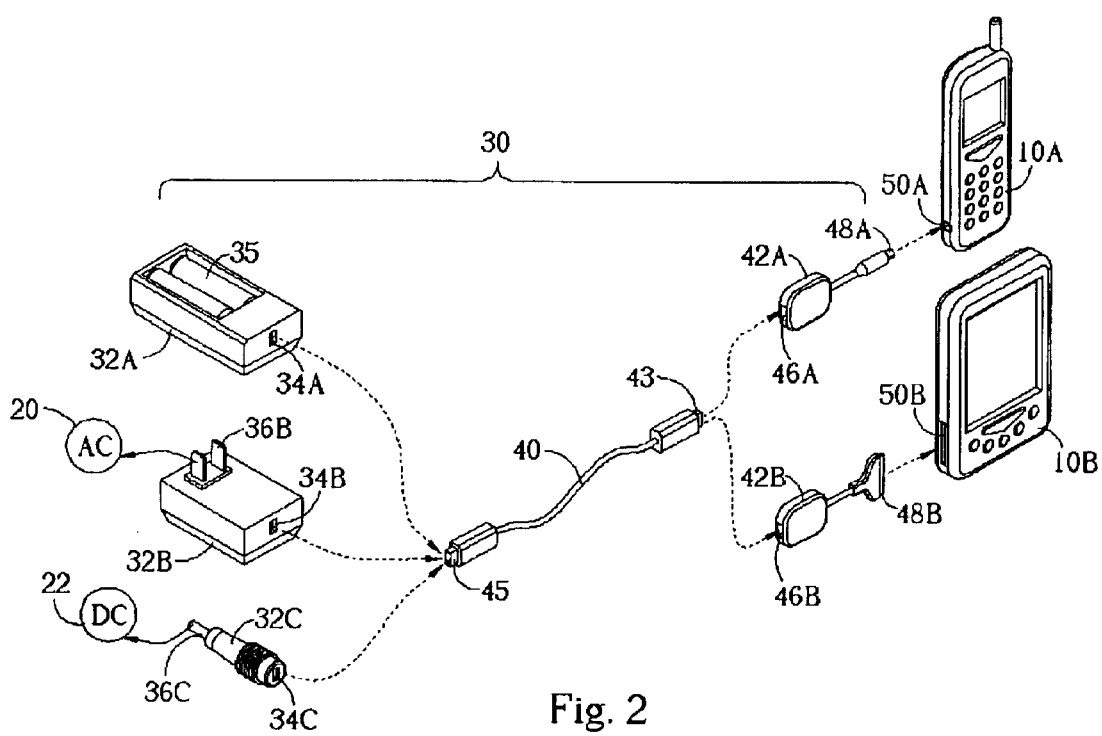
FIG. 2 is a schematic diagram of a charging system of a portable electric device according to the present invention.

Please refer to FIG. 2. FIG. 2 is a schematic diagram illustrating a charging system 30 according to the present invention. Portable electric devices 10A and 10B have corresponding charging ports 50A and 50B for inputting a specially designed DC working voltage into the portable electric devices. The portable electric device can be a mobile phone, a PDA, or obviously nearly any device requiring a DC working voltage. Only two portable electric devices are shown in FIG. 2 allowing easy explanation of this embodiment.

The charging system 30 according to the present invention comprises transformers 32A, 32B, 32C corresponding to respective power supplies and converters 42A and 42B corresponding to the respective portable electric devices. The transformers 32A, 32B, and 32C correspond to different power supply sources. The converters 42A and 42B correspond respectively to the portable electric devices 10A and 10B. A power cord 40, removably connected between a transformer and a converter, transmits a standard DC voltage generated by a transformer to a converter.

In this preferred embodiment, a housing of the transformer is made of a hard plastic. That is, the transformer comprises a hard cubic structure and is easy to carry. Each transformer comprises a standard outputinstalled on the housing. The preferred embodiment, shown in FIG. 2, shows that the transformer 32A alters the power of a battery 35 into the standard DC voltage and outputs the transformed power via an output port 34A. The transformer 32B transforms an AC power 20, input via an input port 36B, into the standard DC voltage and outputs the transformed power via an output port 34B. The transformer 32C changes a DC power 22(for example, provided by a car or an airplane), input via an input port 36C, into a standard DC voltage and outputs the transformed power via an output port 34C. According to the present invention, a different transformer alters each kind of input power into the standard DC voltage and outputs the transformed power via a standard output port. In another words, the shape of the transformers"32A, 32B and 32C output ports 34A, 34B and 34C are the same. The standard DC voltages output via the output ports 34A, 34B and 34C are also the same.

The charging system 30 according to the present invention has a corresponding converter for each portable electric device. Each converter comprises an input port and an output port. Each input port receives a standard DC voltage, but each output port corresponds to a different specially designed charging port of a portable electric device. Each converter inputs a standard DC voltage via an input port 46A or 46B, transforms the input power into a specially designed working voltage of the corresponding portable electric device, and outputs the transformed voltage via an output port 48A or 48B. As shown in FIG. 2, the converters 42A and 42B correspond respectively to the portable electric devices 10A and 10B.

The converters" 42A and 42B respective input ports 46A and 46B are standardized. The output port 48A of the converter 42A corresponds to the charging port 50A of the portable electric device 10A. The converter 42A transforms the standard DC voltage into the specially designed working voltage of the portable electric device 10A and outputs the transformed voltage via the output port 48A. In the same manner, the output port 48B of the converter 42B corresponds to the charging port 50B of the portable electric device 10B. The converter 42B transforms the standard DC voltage into the specially designed working voltage of the portable electric device 10B and outputs the transformed voltage via the output port 48B.

According to the present invention, the power cord 40 transmits electric power between the transformers 32A, 32B and 32C and the converters 42A and 42B. The power cord 40 has a first connection end 45 and a second connection end 43. The first connection end 45 can removably connect to the output port of each transformer. The second connection end 43 can removably connect to the input port of each converter. According to the present invention, the first connection end 45 conforms to the same standard as that of the second connection end 43, making the connection ends 43 and 45 of the power cord 40 interchangeable. The output port of the transformer can be a standard USB, RS232, PS2, or 1394 interface. The corresponding power cord 40, of course, must have the same standard.

An operation of the charging system 30 according to the present invention can be described as follows. When users charge a portable electric device, they connect a transformer to the corresponding power source and the transformer alters the power to the standard DC voltage. An output port of the transformer connects with a first connection end of a power cord. A second connection end of the power cord connects with an input port of a converter. An output port of the converter connects to a charging port of a portable electric device. A power source is transformed into the standard DC voltage by the transformer, output via the standard output port of the transformer, transmitted via the power cord to the standard input port of the converter. The converter alters the standard DC voltage into a specially designed working voltage that is outputted via the output port of the converter to the charging port the portable electric device. Finally, the portable electric device is charged.

Figure 3:
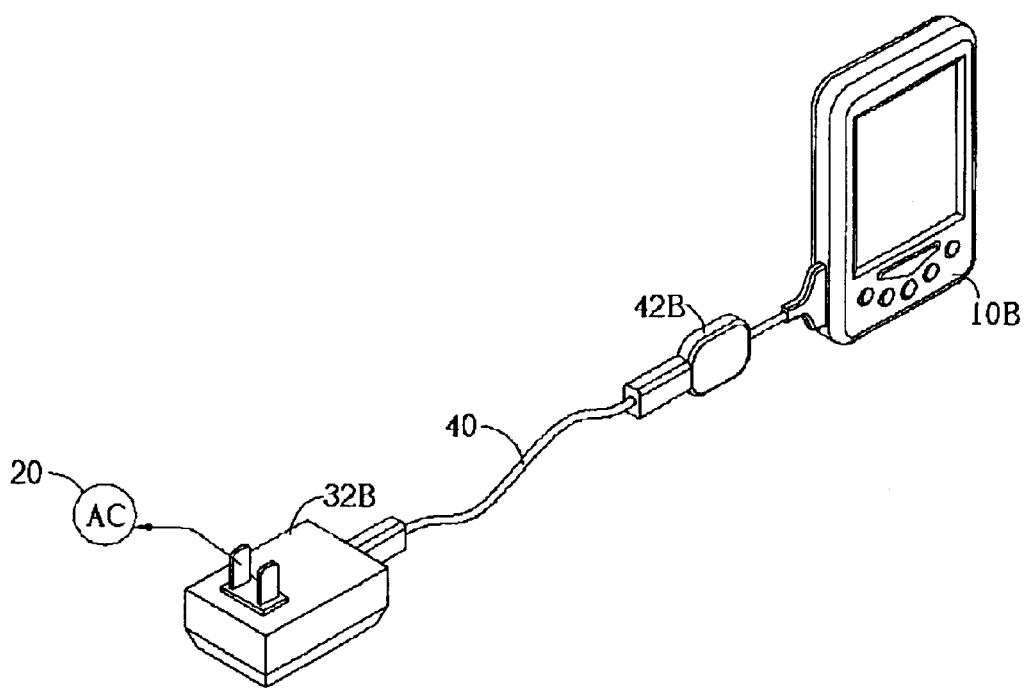
FIG. 3 is a state diagram of a combination of a power source, a transformer, a power cord, a converter, and a portable electric device shown in FIG. 2.

Please refer to FIG. 3 (and FIG. 2). FIG. 3 is a state diagram of a combination of a power source, a transformer, a power cord, a converter, and a portable electric device according to the present invention. To charge the portable electric device 10B, connect the power cord 40 to the output port 34B of the transformer 32B and to the input port 46B of the converter 42B. Now connect the output port 48B of the converter 42B to the input port 50B of the portable electric device 10B. Lastly, connect the input port 36B of the transformer 32B to an AC power source 20. The transformer changes the AC power 20 into the standard DC voltage and the converter 42B transforms the standard DC voltage into a specially designed working voltage that charges the portable electric device 10B via the charging port 50B.

The most important characteristic of the present invention is using a separate power cord to connect the standardized output port of a transformer with the standardized input port of a converter. Thus, there is no need to provide a specially designed transformer for each portable electric device. For example, users can charge the portable electric device 10A with the AC power 20 via the output port 48A of the converter 42A by connecting the power cord 40 between the transformer 32B and the converter 42A. The second connection end 43 of the power cord 40 can connect selectively the converter 42A or 42B to charge the portable electric device 10A or 10B because of the standardized input ports 46A and 46B of the converters 42A and 42B. Additionally, the portable electric device according to the present invention need not provide any specially designed transformers for different input power sources. For example, users can charge the portable electric device 10B with the DC power 22 via the output port 48B of the converter 42B by connecting the power cord 40 between the transformer 32C and the converter 42B.

Because standardized connectors are used, the power cord 40 can selectively connect to the transformers 32A, 32B, and 32C. Therefore, various power sources, such as the battery 35, the AC power 20, or the DC power 22 can be used as long as the second end 43 of the power cord 40 connects to the input port 46B of the converter 42B. It is worthwhile to mention that many portable electric devices comprise a built-in USB standard charging port. The transformers and the corresponding power cords according to the present invention can be designed to the USB standard. Thus, each transformer can transform different power sources to a USB standard voltage and directly charge a portable electric device comprising a USB charging port.

According to the present invention, each portable electric device is equipped with only one corresponding converter. Each power source used requires only one transformer. Users can charge different portable electric devices with different kinds of power sources via a power cord using the standard output port of a transformer and the standard input port of a converter. Therefore, users do not need to carry every charging system with them. The weight and volume of the converter according to the present invention is very small because the converter only transforms a standard DC voltage into another DC voltage. Additionally, the hard, cubic construction of transformers according to the present invention provides for easier carrying and the short power cord makes for easier storage.

In contrast to the prior art, the present invention provides a single power charging system to charge multiple portable electric devices, eliminating the need for complete specially designed charging systems for each portable electric device and for each different kind of power source.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A charging system for charging a plurality of portable devices, each of the portable devices comprising a corresponding charging port for inputting a working voltage of the portable device, each of the portable devices having different working voltages, the charging system comprising:

a plurality of transformers for transforming a plurality of different input voltages into a standard DC (direct current) power voltage, each of the transformers having an output port for outputting the standard DC power voltage;

a power cord comprising a first connection end connected to the output port of the transformer for inputting the standard DC power voltage, and a second connection end for outputting the standard DC power voltage; and a plurality of converters for converting the standard DC power voltage to the working voltage of the plurality of portable devices, each of the converters comprising an input port removably connected to the second connection end of the power cord for receiving the standard DC power voltage, and an output port removably connected to the charging port of a portable device for outputting the working voltage of the portable device;

wherein when charging the plurality of portable devices, users are capable of connecting the corresponding converters to the power cord, and then connecting the power cord to any one of the transformers so as to use the standard DC power voltage to charge the plurality of the portable devices.

2. The charging system of claim 1 wherein the transformer comprises a hard housing, and the output port of the transformer is installed on the hard housing.

3. The charging system of claim 1 wherein the portable device is a mobile phone.

4. The charging system of claim 1 wherein the portable device is a personal digital assistant (PDA).

5. The charging system of claim 1 wherein the transformer is capable of transforming an AC (alternating current) power into the standard DC power voltage.

6. The charging system of claim 1 wherein the transformer is capable of transforming a DC battery power into the standard DC power voltage.

7. The charging system of claim 1 wherein the transformer is capable of transforming a DC power of an automobile into the standard DC power voltage.

8. The charging system of claim 1 wherein the transformer is capable of transforming a DC power of an airplane into the standard DC power voltage.

9. A charging system for charging a portable device, the portable device comprising a charging port for inputting a standard DC (direct current) power voltage, the charging system comprising:

a plurality of transformers for transforming a plurality of different input voltages into the standard DC power voltage, each of the transformers having an output port for outputting the standard DC power voltage; and a power cord comprising a first connection end removably connected to the output port of the transformer for inputting the standard DC power voltage, and a second connection end for outputting the standard DC power voltage;

wherein when charging the portable device, users are capable of connecting the charging port of the portable device to the second connection end of the power cord, and connecting the first connection end of the power cord to the output port of any one of the transformers so as to use the standard DC power voltage to charge the portable device.

10. The charging system of claim 9 wherein the transformer comprises a hard housing, and the output port of the transformer is installed on the hard housing.

11. The charging system of claim 9 wherein the portable device is a mobile phone.

12. The charging system of claim 9 wherein the portable device is a personal digital assistant (PDA).

13. The charging system of claim 9 wherein the transformer is capable of transforming an AC (alternating current) power into the standard DC power voltage.

14. The charging system of claim 9 wherein the transformer is capable of transforming a DC battery power into the standard DC power voltage.

15. The charging system of claim 9 wherein the transformer is capable of transforming a DC power of an automobile into the standard DC power voltage.

16. The charging system of claim 9 wherein the transformer is capable of transforming a DC power of an airplane into the standard DC power voltage.

17. The charging system of claim 9 wherein the second connection end of the power cord is a connection end consistent with the USB (Universal Serial Bus) standard, and the charging port of the portable device is a charging port consistent with the USB standard.

* * * * *